United States Patent
Srinivasan et al.

(10) Patent No.: US 7,451,062 B2
(45) Date of Patent: Nov. 11, 2008

(54) SYSTEM FOR EVALUATING PROCESS IMPLEMENTATION

(75) Inventors: Mahesh Srinivasan, Dunlap, IL (US); Patrice Georges Groisillier, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/477,534

(22) Filed: Jun. 30, 2006

(65) Prior Publication Data

US 2008/0004835 A1    Jan. 3, 2008

(51) Int. Cl.
  *G06F 11/30* (2006.01)
(52) U.S. Cl. ............................... 702/182; 705/7
(58) Field of Classification Search ............. None
  See application file for complete search history.

(56) References Cited

U.S. PATENT DOCUMENTS

| | | | | |
|---|---|---|---|---|
| 5,983,194 | A * | 11/1999 | Hogge et al. ............... | 705/7 |
| 6,058,368 | A * | 5/2000 | Aourane ..................... | 705/7 |
| 6,832,205 | B1 * | 12/2004 | Aragones et al. ........... | 705/10 |
| 2002/0010563 | A1 | 1/2002 | Ratteree et al. | |
| 2002/0091972 | A1 | 7/2002 | Harris et al. | |
| 2003/0078829 | A1 | 4/2003 | Chen et al. | |
| 2004/0039710 | A1 | 2/2004 | McMillan et al. | |
| 2005/0160103 | A1 | 7/2005 | Raffo | |
| 2005/0187851 | A1 | 8/2005 | Sant | |

FOREIGN PATENT DOCUMENTS

JP    2004-274956    9/2004

OTHER PUBLICATIONS

Zequeira, Romulo I., "A Model for Bayesian Software Reliability Analysis", Quality and Reliability Engineering International, May-Jun. 2000, vol. 16, No. 3, pp. 187-193.*
Tobias et al. "Applied Reliability", pp. 1, 384-391, Nov. 9, 1994.*

* cited by examiner

*Primary Examiner*—Manuel L Barbee
(74) *Attorney, Agent, or Firm*—Finnegan, Henderson, Farabow, Garrett & Dunner

(57) ABSTRACT

A method for evaluating process implementation is disclosed. The method includes establishing at least one functional map that relates a first criteria indicative of operational failures associated with operating the process and a second criteria indicative of operational times associated with operating the process. The method also includes establishing a first value indicative of a quantity of operational failures predicted to occur during start-up of the operation of the process. The method also includes establishing a second value indicative of a quantity of operational failures allowed to occur during continued operation of the process. The method further includes predicting a first timing indicative a time the process will be operated to achieve the second value as a function of the first and second criteria.

18 Claims, 3 Drawing Sheets

SYSTEM FOR EVALUATING PROCESS IMPLEMENTATION

TECHNICAL FIELD

The present disclosure relates to a system for a evaluating implementation and, more particularly, to a method and apparatus for a evaluating process implementation.

BACKGROUND

Logistical processes, e.g., a delivery, receiving, or warehousing processes, typically manipulate, e.g., assemble, repackage, store, and/or transport, one or more products. The manipulation of the products usually includes coordinated movement of a plurality of products between various proximate locations, e.g., locations within a common building or facility, and/or remote locations, e.g., locations within different cities, regions, or countries. Typically, logistical processes distribute products among manufacturing entities or between a manufacturing entity and a market entity. Such entities typically have requirements for the logistical process, e.g., delivery lead times, storage or shipment tracking, and/or other specifications. Although the entities allow some failure percentage, that is entities do not require 100% accuracy with respect to the product manipulation, i.e., operation of the logistical process, new or modified logistical processes typically experience higher than acceptable failure percentages and require validation, e.g., start-up, troubleshooting, and transition to substantially uneventful operation, to implement a logistical process within a desired failure percentage. Accurate prediction and tracking of the time associated with validating a process may reduce adverse effects with respect to interrelated processes, e.g., delays cascaded to manufacturing or market entities.

U.S. Patent Application Publication No. 2005/0160103 ("the '103 application") filed by Raffo discloses a system for simulating software design and development. The system of the '103 application includes a library of engineering building blocks configured as generic sub-processes or sub-components which are selected and arranged to establish a model of the software development process. The model includes different process stages, including, requirement analysis, design, implementation, testing, and release. By modeling each of the different stages, the system of the '103 application simulates the development process according to generalized equations as a function of input data. By varying the input data, the system of the '103 application simulates the influence the data have on the development process.

Although the method of the '103 application may model a software development process and provide simulated outcomes, it may not accurately predict the time necessary to validate the process. Additionally, the system of the '103 application may be complex and may require significant expertise to utilize.

The present disclosure is directed to overcoming one or more of the shortcomings set forth above.

SUMMARY OF THE INVENTION

In one aspect, the present disclosure is directed to a method for evaluating process implementation. The method includes establishing at least one functional map that relates a first criteria indicative of operational failures associated with operating the process and a second criteria indicative of operational times associated with operating the process. The method also includes establishing a first value indicative of a quantity of operational failures predicted to occur during start-up of the operation of the process. The method also includes establishing a second value indicative of a quantity of operational failures allowed to occur during continued operation of the process. The method further includes predicting a first timing indicative a time the process will be operated to achieve the second value as a function of the first and second criteria.

In another aspect, the present disclosure is directed to a work environment for evaluating a process implementation. The work environment includes a computer configured to receive a plurality of inputs from a user. The work environment also includes a database that includes a plurality of data indicative of at least one map. The map is configured to functionally relate a first plurality of values indicative of percent of risk associated with operating the process and a second plurality of values indicative of time associated with operating the process. The work environment further includes a program configured to access the at least one map to predict a first timing indicative of the time the process will be operated to achieve a desired percentage of risk.

In yet another aspect, the present disclosure is directed to a method for validating a process. The method includes determining a first risk indicative of a predicted percentage of failures likely to occur during the validation. The method also includes determining a second risk indicative of a percentage of failures acceptable to occur when the process is operated. The method also includes predicting a first timing via a map that is configured to functionally relate risk and time. The first timing is indicative of the time the process will be operated to achieve the second risk.

DETAILED DESCRIPTION

Figure 1:
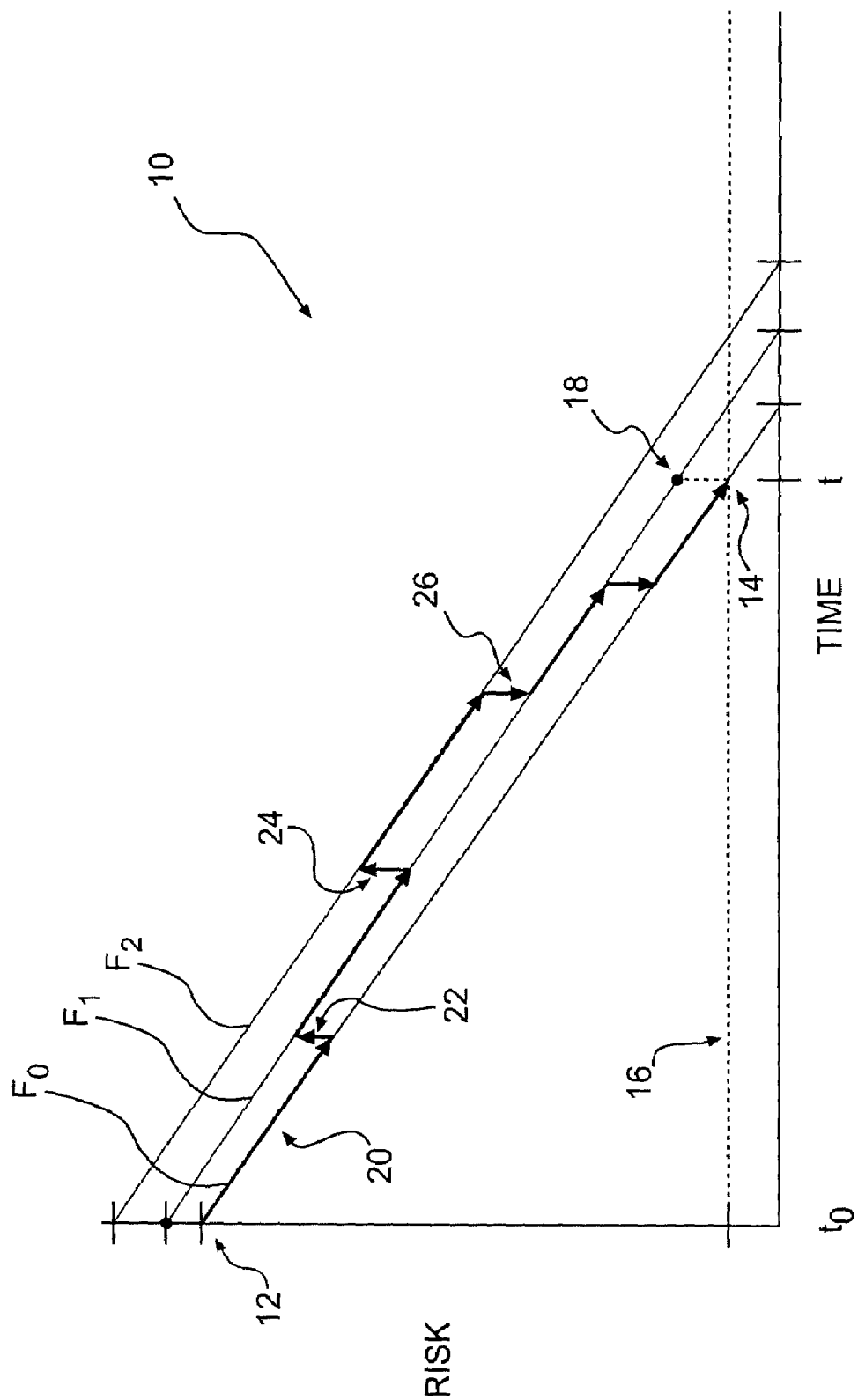
FIG. 1 is a graphical illustration of an exemplary map configured to evaluate process implementation in accordance with the present disclosure.

FIG. 1 illustrates an exemplary map 10. Map 10 may include a multi-dimensional map functionally, e.g., a functional map, relating risk of operating a process and time. The risk may be indicative of the rate at which failures, e.g., operational failures, associated with the process are likely or predicted to occur during operation of the process. For example, a customer may desire a new delivery operation configured to transport one or more products between a manufacturing process, e.g., a factory producing finished products, and a market process, e.g., a retail distributor. The risk for such a delivery operation may include, for example, the rate at which the wrong products are delivered to a particular distributor, the number of late deliveries, the occurrence of product damage during shipping, or other types of inaccurate operation of the delivery operation. The risk may include a value, e.g., a numerical representation, indicative of the likelihood that failures, e.g., operational failures, may occur. It is contemplated that risk may be indicative of a percentage of failures. The time may be indicative of the time the process may be operated, e.g., operational time.

A process may be any logistical operation configured to affect any type of manipulation, such as, for example, arranging, packaging, transporting, assembling, and/or any other type of manipulation known in the art. A failure may be indicative of one or more products manipulated below a desired specification. It is contemplated that a process may include an existing or conceptual process and may include any type of logistical process, such as, for example, cross docking, receiving, warehousing inventory or finished products, repacking, picking, sequencing, kitting, sub-assembling, shipping preparation or loading, delivery, other types of operations, and/or a combination of one or more such operations. It is also contemplated that a failure, e.g., an operational failure, may include a product manipulated below a predetermined requirement. It is further contemplated that the process may be a manufacturing and/or market process and is described herein with reference to a logistical process for exemplary purposes only.

With continued reference to FIG. 1, map 10 may graphically represent a functional relationship between risk and time on substantially perpendicular axes and may include one or more failure lines $F_0$, $F_1$, $F_2$ within a quadrant disposed between the two axes. Failure line $F_0$ may intersect the risk axis at a point 12 which may be indicative of an initial risk of the process. Failure line $F_0$ may also intersect an acceptable risk line 16 at point 14 which may be indicative of the predicted time necessary to achieve the desired risk within a given confidence, e.g., a statistical confidence. The predicted time may be indicative of the time, e.g., validation time, that the process may need to be operated to begin operation, e.g., start-up, identify unforeseen problems, teach personnel how to operate one or more sub-processes, troubleshoot the operation of the process, and/or otherwise obtain confidence in beginning and operating the process as is known in the art. It is contemplated that the functional relation between risk and time may be according to any relation, such as, for example, linearly, logarithmically, exponentially, or any other mathematical relation. It is also contemplated that if the functional relation between risk and time is represented with both axis on a logarithmic scale, a "log-log" scale, failure line $F_0$ may be graphically represented as a substantially straight line having a slope of unit risk to unit time substantially equal to 2:1. It is further contemplated that risk and time may be indicative of any units such as, for example, percent or quantity with respect to risk and/or hours or days with respect to time.

Failure lines $F_0$, $F_1$, $F_2$ may be indicative of zero, one, and two failures, respectively, as identified during the validation of the process. Failure lines $F_0$, $F_1$, $F_2$ may each graphically represent the effect an identified error may have on the predicted time necessary to achieve confidence in operating the process at the desired risk. For example, failure line $F_0$ may indicate the predicted validation time if no additional failures are identified, e.g., no failures occur during validation of the process. Similarly, failure lines $F_1$, $F_2$ may indicate the predicted validation time when one and two failures, respectively, are identified during validation and, thus, map 10 may be utilized to predict the validation time for the process. It is contemplated that map 10 may include any number of failure lines.

Failure line $F_0$ may be determined as a function of the initial risk, e.g., intersection 12, and a predetermined slope. The initial risk value may be determined as a function of the degree of similarity between the process and previously implemented processes. Starting from intersection 12, failure line $F_0$ may be generated and graphically represented as a substantially straight line according to the mathematical equation $Unit_{Risk}=2\times Unit_{Time}+$Initial Risk, e.g., according to the 2:1 slope relation described above. As such, the intersection between failure line $F_0$ and the acceptable risk line 16, e.g., point 14, may be established and time t may be predicted.

Additional failure lines, e.g., failure lines $F_1$, $F_2$, may be determined as a function of the intersection of failure line $F_0$ and the acceptable risk line 16, e.g., point 14, and a statistical distribution formula, e.g., a chi-square ("$X^2$") formula. Starting from point 14, a first point, point 18, of failure line $F_1$ may be determined according to the mathematical equation $R_i=X^2[(n+1),(k_{conf})]/(2\times T_i)$; wherein $R_i$ represents the risk value, $X^2$ represents the chi-square statistical distribution function, n represents the number of failures, $k_{conf}$ represents the desired statistical confidence level for validating the process, and $T_i$ represents the time to achieve the $R_i$ risk value. The statistical distribution formula, chi-square is well known in the art and, as such, is not further described. For example, the risk associated with the existence of one failure at time t may be represented as $R_i=X^2[(1+1),(k_{conf})]/(2\times t)$; which may be greater than the desired risk as predicted by the failure line $F_0$. The remainder of points along failure line F1 may be established by functionally relating point 18 and a predetermined slope which may or may not be substantially equal to the slope of failure line $F_0$. It is contemplated that failure line $F_1$, may, alternatively, be established by determining a second point of failure line $F_1$ similar to determining point 18 with respect to a different time value, e.g., time zero $t_0$. It is also contemplated that additional failure lines, e.g., failure line $F_2$, may be determined similarly as failure line $F_1$. It is further contemplated that each of failure lines $F_0$, $F_1$, $F_2$ may be parallel and may or may not be equally spaced apart with respect to a linear, logarithmic, or exponential functional relation.

Figure 2:
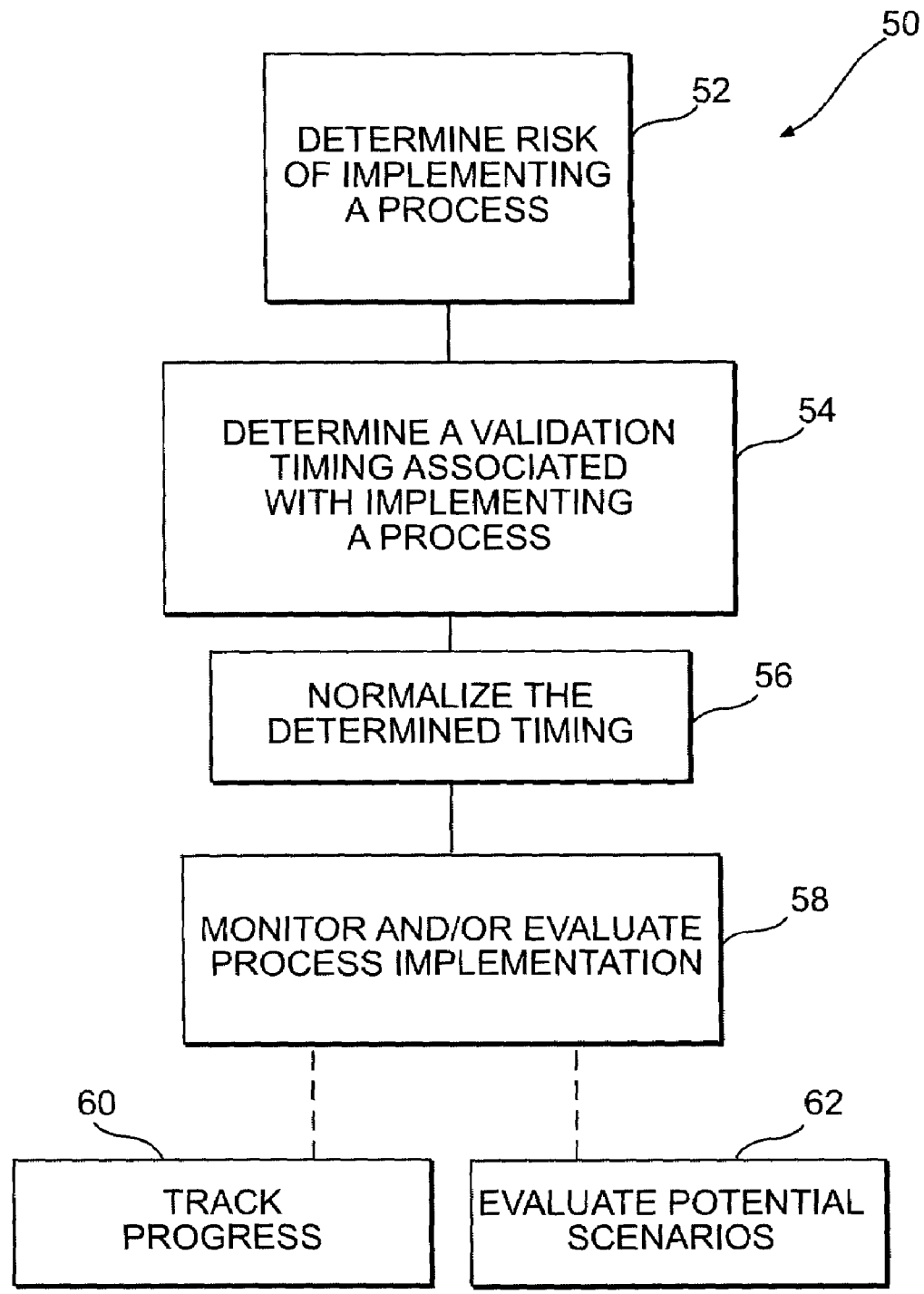
FIG. 2 is a diagrammatic illustration of an exemplary method of evaluating process implementation configured to be performed in conjunction with the map of FIG. 1.

FIG. 2 illustrates an exemplary method 50 for evaluating process implementation. Method 10 may include determining risk of implementing a process, step 52, determining a validation timing associated with implementing a process, step 54, and normalizing the determined timing, step 56. Method 50 may also include monitoring and/or evaluating process implementation, step. 58, tracking progress, step 60, and evaluating potential scenarios, step 62. It is contemplated that the steps associated with method 50 may be performed in any order and are described herein in a particular sequence for exemplary purposes only. It is also contemplated that method 10 may be performed continuously, periodically, singularly, as a batch method, and/or may be repeated as desired.

Step 52 may include determining risk of implementing a process, e.g., establishing intersection 12 and acceptable risk line 16 (referring to FIG. 1). Specifically, step 52 may include establishing an initial risk associated with implementing a process and a desired risk associated with operating the process. The initial risk may be indicative of a predicted amount of failures likely to occur during process implementation and may be a function of the amount of new content within a particular process. New content may include, for example, the amount of customized sub-processes that are new or unique to the particular process or the amount of sub-processes that have not been previously implemented with respect to another process. The initial risk may be determined by subdividing the process into one or more sub-processes and comparing each of the one or more sub-processes with one or more previously developed or operated sub-processes. Each sub-process may have a generic risk associated therewith that may be indicative of, for example, an industry standard risk, a experience based risk, historically determined risk, and/or any other type of risk assessment known in the art.

The similarity between a previous sub-process and a current sub-process may be qualitatively determined as a function of experience and/or expertise and the generic risk may be reduced as a function of the similarity. It is contemplated that the amount of risk may be reduced from the initial risk toward the desired risk as the particular process is validated, e.g., as personnel gain experience performing one more sub-processes and the likelihood of the occurrence of additional failures correspondingly reduces. The desired risk may be indicative of the amount of failures a customer allows or accepts from operation of the process. Specifically, the desired risk may be determined based on any suitable criteria known in the art, such as, for example, experience, desired profitability, cost of operating the process, and/or best practices. It is contemplated that the desired risk may or may not be zero.

Step 54 may include determining a validation timing associated with implementing a process. Specifically, step 54 may include determining the time the process will be operated from the initial risk toward the desired risk and may include establishing at least one failure line, e.g., failure line $F_0$, within map 10 (referring to FIG. 1). It is contemplated that step 54 may determine the functional relation via any suitable means, such as, for example, test data, historically correlated data, past experience, best practices, and/or any other method known in the art. It is also contemplated that performing step 54 may include establishing additional failure lines, e.g., failure lines $F_1$, $F_2$, and that performing steps 52 and 54 may include establishing map 10.

Step 56 may include normalizing the determined validation timing. Specifically, step 56 may include correlating the predicted validation time that may be, for example, represented in hours, with respect to the particular resources for operating the process to represent the validation time in, for example, days or shifts. The resources of the process may include, for example, the quantity of personnel performing one or more tasks or sub-processes, e.g., number of workers, the quantity of shifts the personnel may be work, e.g., a given number of shifts per day, the time duration of a given shift, e.g., a given number of hours, the quantity of manipulations that may be performed within a given period of time, e.g., cycles per hour, the time duration that the process may be operated, e.g., a given number of years, and/or any other process resources known in the art. For example, step 56 may include determining the validation time per units of days by functionally relating a determined validation time per units of hours, the desired risk, and one or more process resources. It is contemplated that the functional relation to normalize the determined duration may be any suitable mathematical relation known in the art and may be linear, logarithmic, or exponential. It is also contemplated that one or more of the resources associated with the process may be determined from experience, test data, historical data, expertise, and/or any other suitable method known in the art and may or may not be variable.

Step 58 may include monitoring and/or evaluating the process implementation. Step 58 may include utilizing map 10 to determine and/or compare actual progress with predicted progress and/or predict the effects potential failures may have on both the actual and predicted progress. Specifically, step 58 may also include performing one or more of steps 60 and 62.

Step 60 may include tracking progress. Specifically, step 60 may include monitoring the progress of process implementation and may utilize map 10. For example, and with reference to FIG. 1, process validation may begin at time $t_0$ and the initial risk may be indicated at intersection 12. By following failure line $F_0$ from intersection 12 and along arrow 20, map 10 may indicate that at some time after time $t_0$, the validation of the process may still be completed as predicted, e.g., at time t corresponding to intersection 14. Additionally, if a failure occurs after time zero, step 60 may include moving from failure line $F_0$ to failure line $F_1$ as indicated by arrow 22. Failure line $F_1$ may intersect the desired risk line 16 at a time value greater than time t and thus predict a longer validation time. Similarly, if another failure occurs, step 60 may include moving from failure line $F_1$ to failure line $F_2$ as indicated by arrow 24. Additionally, if a failure is solved, e.g., corrected, overcome, or understood, step 60 may include moving from failure line $F_2$ to failure line $F_1$ as indicated by arrow 26 and predicting a validation time less than the time value predicted via failure line $F_2$. Accordingly, step 60 may monitor the occurrence of failures and may track the progress of process implementation by selectively moving between failure lines and predicting the time to complete the validation as a function of the intersection of the presently utilized failure line and desired risk line 16.

Step 62 may include evaluating potential scenarios. Similar to step 60, step 62 may predict the effect that a future failure may have on the validation time. That is, step 62 may include anticipating both occurrences of failures and solutions to failures and may utilize map 10 to determine the potential impact that such an occurrence may have on the validation time, e.g., increasing or decreasing the validation timing. As such, steps 58, 60, 62 may predict the time that the process will be operated until the desired risk is achieved, e.g., predict the validation time as a function of the initial risk, desired risk, and occurrence of failures during validation.

Figure 3:
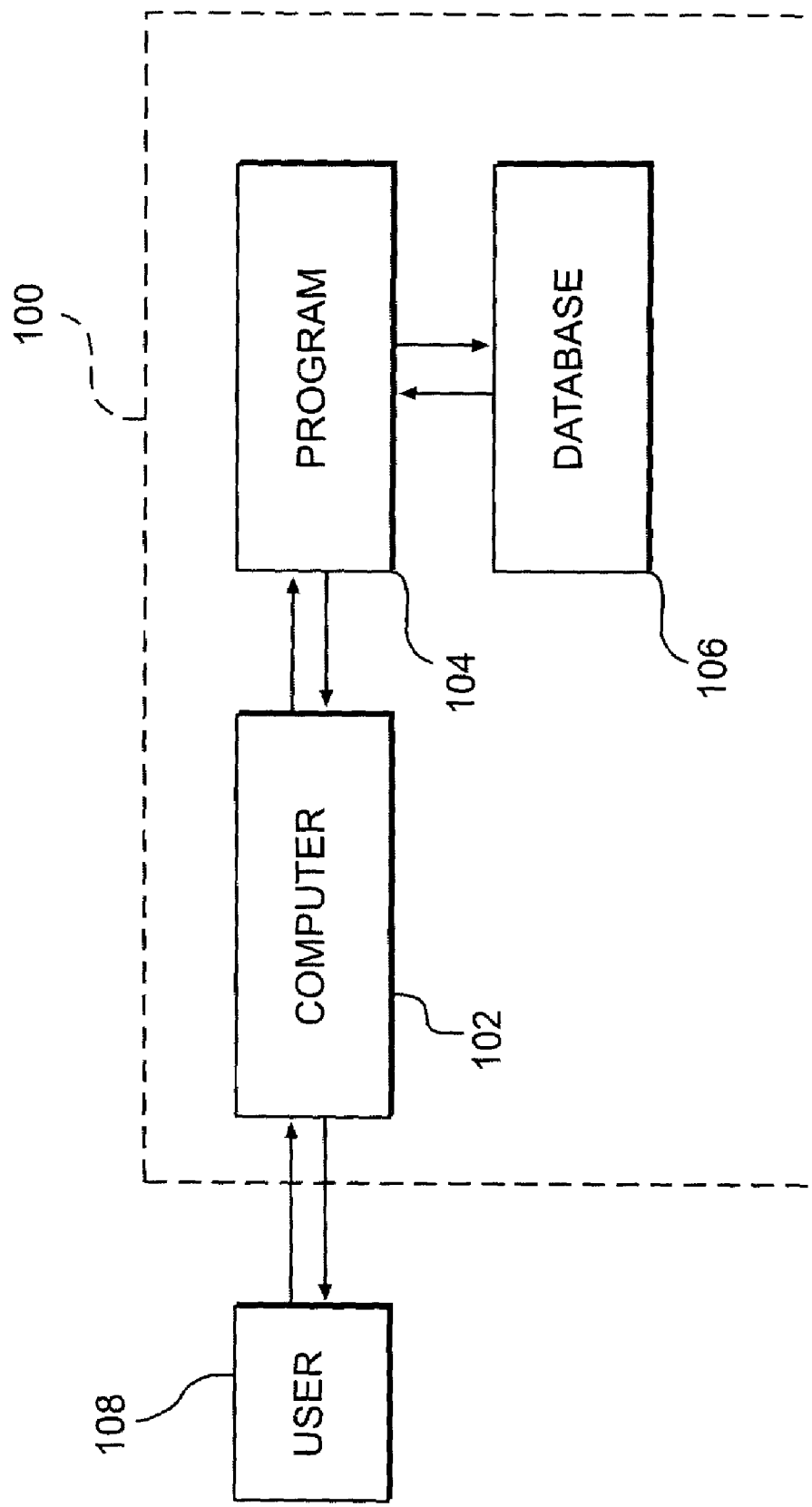
FIG. 3 is a diagrammatic illustration of an exemplary work environment configured to perform the one or more steps of the method of FIG. 2.

FIG. 3 illustrates an exemplary work environment 100 for performing method 10. Work environment 100 may include a computer 102, a program 104, and a database 106. Work environment 100 may be configured to accept inputs from a user 108 via computer 102 to evaluate process implementation and may also be configured to communicate and/or display data or graphics to user 108 via computer 102. It is contemplated that work environment 100 may include additional components such as, for example, a communications interface (not shown), a memory (not shown), and/or other components known in the art.

Computer 102 may include a general purpose computer configured to operate executable computer code. Computer 102 may include one or more input devices, e.g., a keyboard (not shown) or a mouse (not shown), to introduce inputs from user 108 into work environment 100 and may include one or more output devices, e.g., a monitor, to deliver outputs from work environment 100 to user 108. Specifically, user 108 may deliver one or more inputs, e.g., data, into work environment 100 via computer 102 to supply data to and/or execute program 104. Computer 102 may also include one or more data manipulation devices, e.g., data storage or software programs (not shown), to transfer and/or alter user inputs. Computer 102 may also include one or more communication devices, e.g., a modem (not shown) or a network link (not shown), to communicate inputs and/or outputs with program 104. It is contemplated that computer 102 may further include additional and/or different components, such as, for example, a memory (not shown), a communications hub (not shown), a data storage (not shown), a printer (not shown), an audio-video device (not shown), removable data storage devices (not shown), and/or other components known in the art. It is also contemplated that computer 102 may communicate with program 104 via, for example, a local area network ("LAN"), a hardwired connection, and/or the Internet. It is further contemplated that work environment 100 may include any number of computers and that each computer associated with work environment 100 may be accessible by any number of users for inputting data into work environment 100, communicating data with program 104, and/or receiving outputs from work environment 100.

Program 104 may include a computer executable code routine configured to perform one or more sub-routines and/or algorithms to evaluate a process implementation within work environment 100. Specifically, program 104 may be configured to perform one or more steps of method 10. Program 104 may receive inputs, e.g., data, from computer 102 and perform one or more algorithms to manipulate the received data. Program 104 may also deliver and/or communicate, e.g., display, one or more outputs, e.g., algorithmic results, to user 108 via computer 102. Program 104 may also access database 106 to locate and manipulate data stored therein to arrange and/or display stored data to user 108 via computer 102, e.g., via an interactive object oriented computer screen display. It is contemplated that program 104 may be stored within the memory (not shown) of computer 102 and/or stored on a remote server (not shown) accessible by computer 102. It is also contemplated that program 104 may include additional sub-routines and/or algorithms to perform various other operations with respect to mathematically representing data, generating or importing additional data into program 104, and/or performing other computer executable operations. It is further contemplated that program 104 may include any type of computer executable code, e.g., C++, and/or may be configured to operate on any type of computer software.

Databases 106 may be configured to store and arrange data and to interact with program 104. Specifically, database 106 may be configured to store and arrange data indicative of the initial risk, desired risk, functional relationship established during steps 52 and 54 (referring to FIG. 2). Database 106 may be configured to store and arrange data indicative of one or more sub-processes, one or more multi-dimensional maps, e.g., map 10 (referring to FIG. 1), and/or process resources, e.g., manpower, number of shifts, and/or other process resources known in the art. Database 106 may store and arrange any quantity of data arranged in any suitable or desired format. Program 104 may be configured to access database 106 to identify particular data therein and display such data to user 108. It is contemplated that database 106 may include any suitable type of database such as, for example, a spreadsheet, a two dimensional table, or a three dimensional table, and may arrange and/or store data in any manner known in the art, such as, for example, within a hierarchy, in groupings according to associated data, and/or searchable according to associated identity tags.

User 108 may include any entity configured to input data into and/or receive data from work environment 100. For example, user 108 may include a project manager configured to evaluate process implementation and/or coordinate efforts configured to perform the process implementation. For example, user 108 may populate database 106 with data indicative of one or more sub-processes, the resources associated with a process, and may, in conjunction with program 104, perform one or more steps of method 50. It is contemplated that user 108 may include any number of different entities that each may perform any number of different steps and/or actions within method 50.

INDUSTRIAL APPLICABILITY

The disclosed system for evaluating process implementation may be applicable to evaluate any type of process. The disclosed system may predict the time a process may be operated before achieving a desired quantity of operational failures and may monitor and evaluate progress of the process implementation. Map 10 and the operation of method 50 will be explained below with reference to a logistical process for exemplary purposes only.

For example, an entity may desire a logistical process, e.g., a delivery operation, to transport a plurality of products from a first manufacturing facility to a second manufacturing facility and may tolerate a 2% failure rate for the delivery operation. Similar operations may have been previously developed and operated, however, the delivery operation may include a portion of new content. As such, method 50 may be performed, in conjunction with map 10, to predict the validation time of a new or modified process.

Referring to FIGS. 1-3, user 108, e.g., a project manager or other entity personnel, may perform one or more steps within method 50 to predict a validation time for the delivery operation and may track the progress thereof. Specifically, user 108 may develop and utilize map 10 to evaluate the implementation of the delivery operation. Map 10 may functionally relate the new content of the delivery operation, e.g., the degree of difference between the type of packaging of the products, the quantity of products, the type of products, the delivery schedule, and/or any other process characteristic known in the art, with respect to previously operated processes to determine an initial risk (step 52). The initial risk may represent the likelihood that failures will occur during operation of the delivery operation because of the new content and the lack of confidence in the operation because of unforeseen failures. The entity's tolerated failure rate, e.g., acceptable risk line 16, and the initial risk, e.g., intersection 12, may be functionally related within map 10 to predict a validation time, e.g., intersection 14, via failure line $F_0$ (step 54). Intersection 14 may predict the time the delivery operation will be operated to reduce the risk associated with its operation, and to achieve a statistical confidence that continued operation of the delivery operation will meet the entity's tolerated failure rate.

The predicted validation time may be normalized to the delivery operation as a function of the resources associated with the delivery operation (step 56). For example, the predicted validation time may be correlated from hours to days as a function of the number of personnel, number of shifts, and/or additional resources associated with the delivery operation. Additionally, the predicted validation time may be increased or decreased as a function of one or more failures occurring, solved, predicted to occur, and/or predicted to be solved (step 58). It is contemplated that a contractor may utilize map 10 and perform method 50 to predict validation times and develop proposals and/or bids to solicit business opportunities for process implementation development and/or management with respect to a customer.

Because method 50 and, in particular, map 10, predicts a validation time as a function of the amount of new content and functionally relates risk and time, the accuracy of determining the time required to implement a process may be improved. Because map 10 may include multiple failure lines, the accuracy of process implementation may be improved by tracking the occurrence of additional failures and their affect on the predicted validation timing.

It will be apparent to those skilled in the art that various modifications and variations can be made to the disclosed system for a evaluating process implementation. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method for evaluating process implementation comprising:

establishing at least one functional map relating a first criteria indicative of operational failures associated with operating the process and a second criteria indicative of operational times associated with operating the process;

establishing a first value indicative of a quantity of operational failures predicted to occur during start-up of the operation of the process;

establishing a second value indicative of a quantity of operational failures allowed to occur during continued operation of the process during start-up; and predicting a first timing indicative of a time the process will be operated to reduce operational failures occurring during start-up from the first value to the second value as a function of the first and second criteria;

wherein the process is configured to manipulate a plurality of products and an operational failure occurs when one of the plurality of products is not manipulated according to desired specifications.

2. The method of claim 1, wherein the first timing is further indicative of the time the process will be operated to achieve the second value within a statistical confidence threshold.

3. The method of claim 1, wherein the process is a logistical process and includes at least one of a cross docking, receiving, warehousing, repacking, picking, sequencing, kitting, sub-assembly, or shipping operation.

4. The method of claim 1, wherein the first value is established as a function of the amount of new content the process has with respect to at least one previously implemented process, the method further including functionally mapping the first and second values within the map according to a predetermined equation.

5. The method of claim 4, wherein the map includes first and second axis each having a logarithmic scale and the predetermined equation is indicative of a 2:1 ratio between the first criteria and the second criteria.

6. The method of claim 1, wherein the process implementation includes troubleshooting a start-up of a process, the method further including predicting a second timing indicative of a time the process will be operated to achieve the second value as a function of the first timing and at least one additional operational failure identified during the troubleshooting start-up.

7. A work environment for evaluating a process implementation comprising:

a computer configured to receive a plurality of inputs from a user;

a database including a plurality of data indicative of at least one map configured to functionally relate a first plurality of values indicative of percent of risk associated with operating the process and a second plurality of values indicative of time associated with operating the process and a program configured to access the at least one map to predict a first timing indicative of the time the process will be operated to reduce risk associated with operating the process from an initial percentage of risk to a desired percentage of risk;

wherein the map is further configured to functionally relate the first and second plurality of values according to a dual logarithmic scale; and the map includes a plurality of plots each having a slope of two units of the first plurality of values to one unit of the second plurality of values.

8. The work environment of claim 7, wherein the program is further configured to:

receive at least one input from the computer indicative of the similarity between the process and at least one previously implemented process; and determine the initial percentage of risk as a function of the at least one input;

9. The work environment of claim 7, wherein the desired percentage of risk is indicative of an acceptable amount of operational failures 10. The work environment of claim 7, wherein the process implementation includes at least one of a cross docking, receiving, warehousing, repacking, picking, sequencing, kitting, sub-assembly, or shipping operation.

11. The work environment of claim 7, wherein the process is configured to manipulate a plurality of products and the initial percentage risk is indicative of an amount of operational failures predicted to occur during start-up of the process.

12. A method of validating a process comprising:

determining a first risk indicative of a predicted percentage of failures likely to occur during the validation;

determining a second risk indicative of a percentage of failures acceptable to occur when the process is operated;

predicting a first timing via a map configured to functionally relate risk and time, the first timing indicative of the time the process will be operated to achieve the second risk;

identifying at least one first sub-process associated with the process;

comparing the at least one first sub-process with a second sub-process associated with a previously implemented process;

determining a first value indicative of a predetermined amount of risk associated with the second sub-process;

determining the first risk as a function of the first and second values.

13. The method of claim 12, further including:

operating the process; and identifying at least one additional failure during the validation and predicting a second timing via the map, the second timing indicative of the time the process will be operated to achieve the second risk, wherein the second timing is greater than the first timing.

14. The method of claim 13, further including solving the at least one additional failure during the validation and predicting a third timing via the map, the third timing indicative of the time the process will be operated to achieve the second risk, wherein the third timing is less than the second timing.

15. The method of claim 12, wherein the process is a logistical process including at least one of a cross docking, receiving, warehousing, repacking, picking, sequencing, kitting, sub-assembly, or shipping operation.

16. The method of claim 12, further including normalizing the first timing as a function of the resources associated with the process, wherein normalizing the first timing includes functionally relating the first timing and at least one resource associated with the process.

17. The method of claim 12, further including predicting an effect an occurrence of at least one additional error has on the first timing.

18. The method of claim 17, wherein the predicted effect increases the risk associated with operating the process.

* * * * *